United States Patent
Hasselgren et al.

[11] Patent Number: 5,909,481
[45] Date of Patent: Jun. 1, 1999

[54] METHOD RELATING TO TELECOMMUNICATIONS

[75] Inventors: Joakim Hasselgren, Älvsjö; Sören Wallinder, Haninge, both of Sweden

[73] Assignee: Telefonaktiebolaget LM Ericsson, Sweden

[21] Appl. No.: 08/879,079

[22] Filed: Jun. 19, 1997

[30] Foreign Application Priority Data

Jun. 20, 1996 [SE] Sweden .................................. 9602457

[51] Int. Cl.⁶ .................................................. H04M 1/24
[52] U.S. Cl. ........................ 379/27; 379/93.01; 379/93.09
[58] Field of Search ............................... 379/93.01, 93.09, 379/93.14, 100.01, 100.15, 100.16, 100.17, 210

[56] References Cited

U.S. PATENT DOCUMENTS

| | | |
|---|---|---|
| 4,856,049 | 8/1989 | Streck . |
| 5,014,296 | 5/1991 | Saigano . |
| 5,287,402 | 2/1994 | Nakajima . |
| 5,467,390 | 11/1995 | Brankley et al. . |
| 5,487,105 | 1/1996 | Sakai . |
| 5,519,768 | 5/1996 | Moquin et al. ..................... 379/100.01 |

FOREIGN PATENT DOCUMENTS

WO93/20641  10/1993  WIPO .

*Primary Examiner*—Curtis A. Kuntz
*Assistant Examiner*—Melur. Ramakrishnaiah
*Attorney, Agent, or Firm*—Burns, Doane, Swecker & Mathis, L.L.P.

[57] ABSTRACT

The present invention relates to a method of setting up a connection between a first terminal (A), which may be a calling telephone, telefax machine, computer or other equipment that can make a call, and a second terminal (Ct, Cf) which may be a called telephone (Ct) on the one hand or, on the other hand, a called telefax machine (Cf), a computer (Cf) or other equipment (Cf) that can receive a call. According to the invention, the first terminal (A) calls a subscriber number, a fictitious response is sent to the first terminal (A) and monitoring of the first terminal (A) is commenced so as to identify the type of terminal concerned with the aid of possible signals and/or a possible message, while a called telephone (Ct) is ordered to commence ringing. When signals or a message are/is detected, the called telephone (Ct) is ordered to stop ringing and the possible message is received and sent to a second terminal (Cf), or else the called telephone (Ct) is connected to the first terminal (A).

12 Claims, 9 Drawing Sheets

METHOD RELATING TO TELECOMMUNICATIONS

FIELD OF INVENTION

The present invention relates to a method of quickly detecting telefax messages or data messages within telephony in order to distinguish these messages from normal telephone calls.

BACKGROUND OF THE INVENTION

As will be evident from WO 93/20641, it is known to add a prefix to a telephone number in order to identify the type of communication concerned and therewith distinguish a telephony call from a telephone and a telefax. This is, in actual fact, equivalent to using different telephone numbers.

If a telefax is connected to the same telephone number as a telephone, it is possible to use additional signalling to identify when it is the telefax that is called; c.f. U.S. Pat. No. 5,287,402. It is only the most modern telefaxes that are able to deal with such signalling, however.

DISCLOSURE OF THE INVENTION

The object of the present invention is to enable telefax signals, data signals and like signals to be detected quickly and in a simple manner when one and the same telephone number is used to call the telephone, and also to establish a telefax connection, computer connection or some like connection. One problem in this respect is that there has been no fast and simple manner in which such detection can be achieved with all types of telefax machines.

This problem is solved by the present invention, according to which a fictitious response is sent to the calling terminal while ordering the called telephone to begin to ring. If the calling terminal is a telefax, it will believe that it is a telefax that has answered and will begin to send its telefax message, possibly preceded by handshake signals.

This message or these signals is/are heard in a message centre and the calling terminal is identified as being a telefax. The message can then be sent to the called telefax and the called telephone is ordered to stop ringing. If the calling terminal is instead a telephone, a call connection will be established immediately the receiver of the called telephone is lifted. This calling of a telephone and a telefax in parallel with one another will save time, since it normally takes some seconds for a person to answer the telephone.

The invention has the advantage of functioning with both older and more modern telefaxes without the need of additional signalling and of enabling telefax detection to be achieved quickly and without delay and of obviating the risk of a person, either the calling or the called person, needing to listen to "discordant" telefax signals.

The invention will now be described in more detail with reference to preferred embodiments thereof and also with reference to the accompanying drawings.

DETAILED DESCRIPTION OF PREFERRED EMBODIMENTS

In FIGS. 1–6, which will be described hereinafter, applies generally that when a channel 1, 4, 5, 6, 11, 12, 13, 21, 31 passes through a telephone network N, the connection can either be established directly or via one or more exchanges or switching centres in the network N in a known manner. This is shown in broken lines. Pure signalling channels 2, 3 are shown in dotted lines.

Telefax Detection

One possible way of conducting telefax detection when older telefax machines are used is to send a fictitious response with each telephony call, so that a possible telefax will begin to send its message. The receiving terminal then listens for any possible handshake signals or a possible telefax message and it is known after 3–4 seconds whether a telefax machine is calling or not. This procedure is satisfactory provided that it is actually a telefax machine that called. The problem is that all normal telephone calls will also be delayed by 3–4 seconds, which is unacceptable.

The present invention utilizes, instead, the fact that it normally takes a few seconds before a person is able to answer the telephone. The use of intelligent network services also provides some control over the calling subscriber, because it is possible to some extent to control when a calling telefax machine shall send its telefax message and the like.

Figure 1:
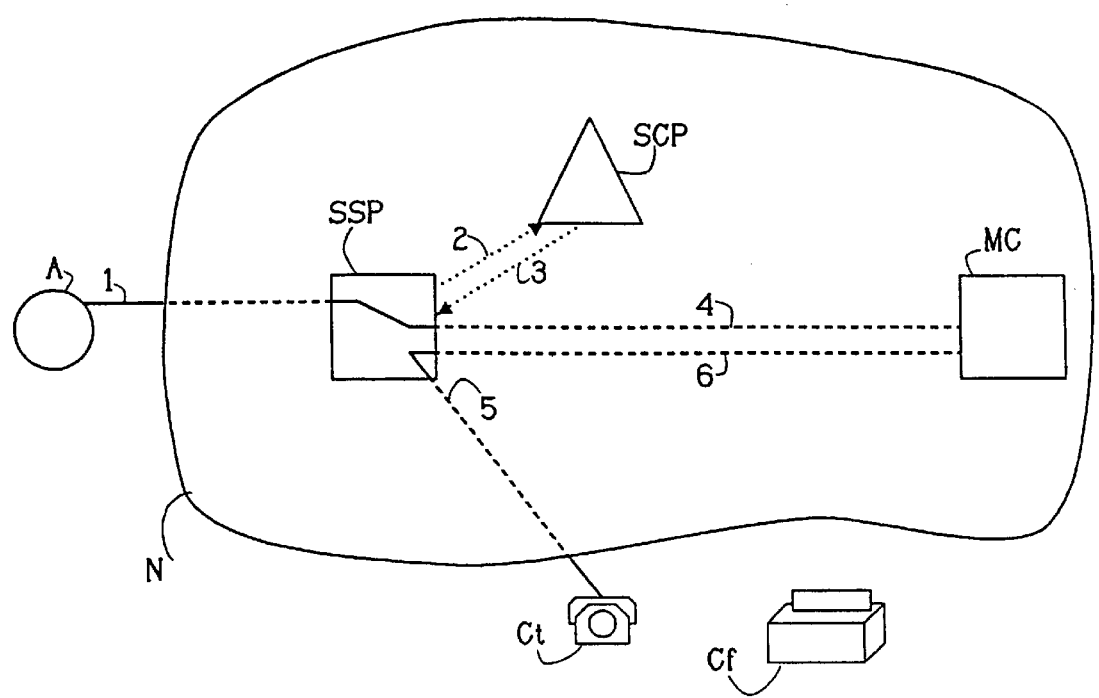
FIG. 1 is a diagrammatic illustration of the detection of telefax signals or data signals.
Figure 7:
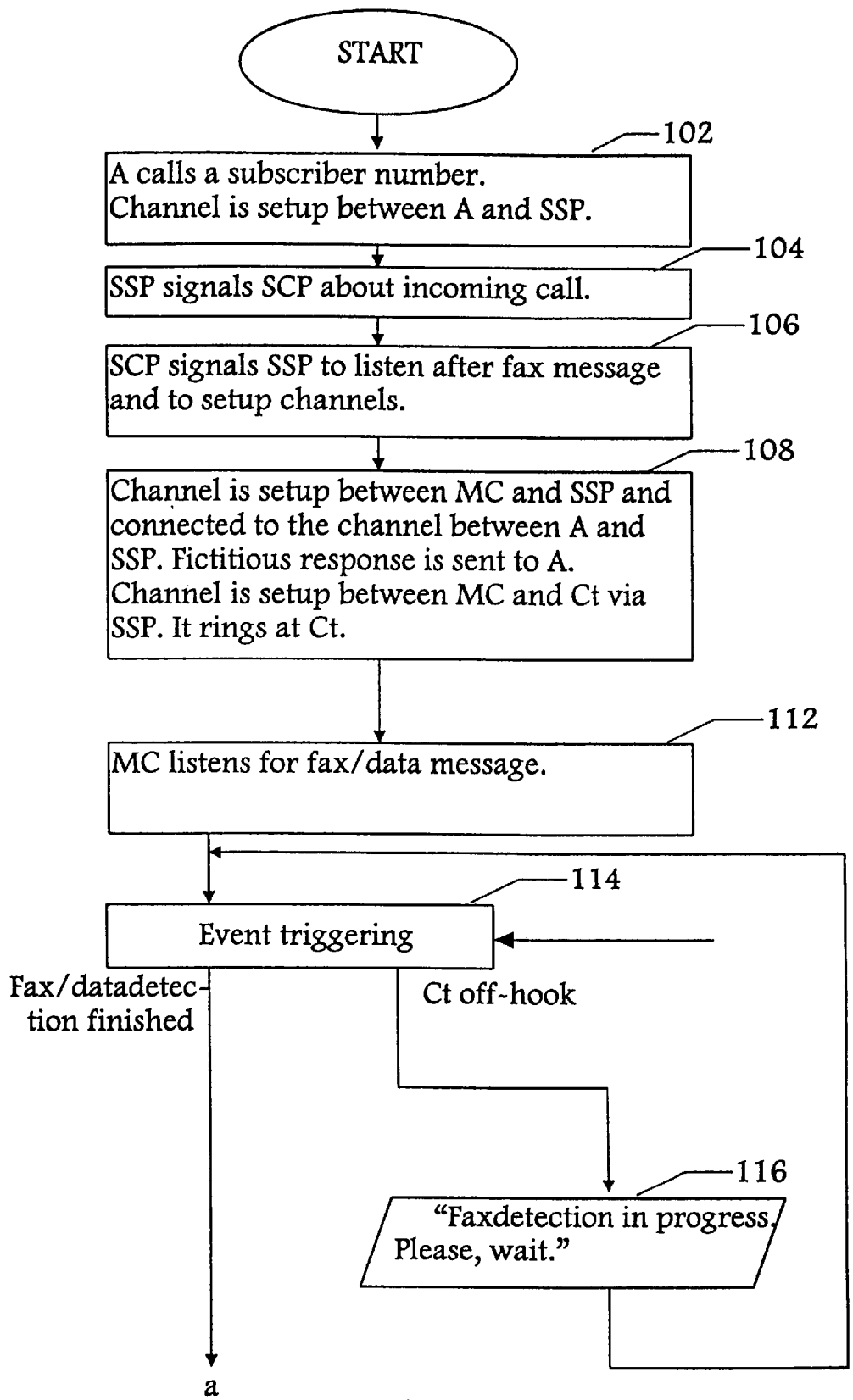
FIG. 7 is a flowchart illustrating the detection of telefax signals or data signals.
Figure 8:
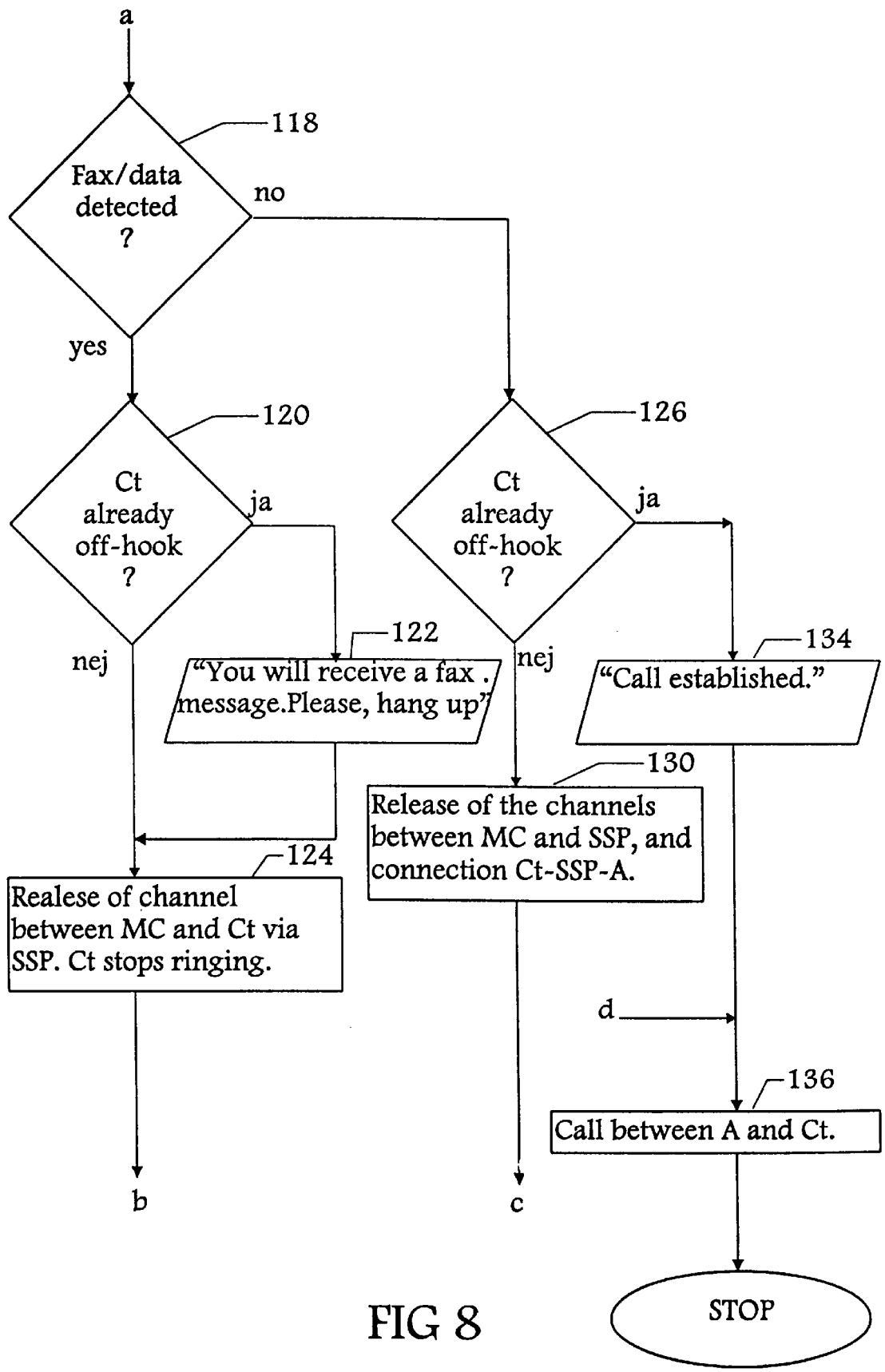
FIG. 8 is a flowchart which is a continuation of the flowchart in FIG. 7 and illustrates reception of a call and the reception of telefax signals or data signals respectively.

FIGS. 1, 7 and 8 illustrate detection of telefax messages in accordance with the invention. A subscriber calling from terminal A calls a special telephone number, block 102. In the illustrated case, the calling terminal A may be a telephone or a telefax machine. A channel 1 is setup through the telephone network N to a service switching point SSP, in a known manner. The service switching point SSP is cognisant of the fact that the number called is a special type of telephone number and informs a service control point SCP of the fact over a signalling channel 2, this control point identifying the telephone number in turn, block 104.

In the illustrated case, the number is special inasmuch that the calling subscriber calls the same number from his calling terminal A irrespective of whether he wishes to call a telefax machine Cf or a telephone Ct. Stored in the service control point SCP are one or more telephone numbers for the called telephone Ct on the one hand and for the called telefax machine Cf on the other. A telephone answering machine may be used instead of the called telephone Ct. Switching is effected to that number which is activated at that moment in time. If there are several numbers to choose from, the concept is normally referred to as personal telephony or personal mobility (UPT, Universal Personal Telecommunications).

Subsequent to identifying the called number, the service control point SCP signals the service switching point SSP over a signalling channel 3 and commands the service switching point to listen for a possible telefax message and to setup a channel 5 to a called telephone Ct in accordance with relevant programming in the service control point SCP, block 106.

The service switching point SSP sets up a channel 4 to a message centre MC and connects said channel with the channel 1 between the calling terminal A and the service switching point SSP. A fictitious response is then sent to the calling terminal A. If the calling terminal A is a telefax machine, it will now believe that the called telefax machine Cf has answered and will begin to send a telefax message, optionally preceded by handshake signals.

The service switching point SSP also sets up a channel 5 to the called telephone Ct and a channel 6 to the message centre MC. These two channels 5, 6 are then combined to provide a connection between the message centre MC and the called telephone Ct via the service switching point SSP, whereafter the service switching point SSP orders the called telephone Ct to begin to ring, block 108.

The message centre MC in turn is ordered by the service switching point SSP to lie and listen for a possible telefax message or possible handshake signals, block 112, although for a pre-set maximum time, e.g. 3–4 seconds. The called telephone Ct rings during this listening period. This procedure saves time; it normally takes a few seconds for a person to answer the call. The message centre MC will normally have had time to detect the type of call concerned during this period.

When the calling terminal A is, instead, a telephone, there will be no sound in the receiver during the 3–4 seconds during which detection takes place. Normally, fictitious ringing signals are sent to the calling subscriber at the calling terminal A, so that the subscriber will "hear" the called telephone Ct ringing on the other side. It is not appropriate, however, to send the signals whilst telefax detection is taking place, because this might possibly disturb any telefax machine that wishes to transmit. If telefax detection is found to be negative after 3–4 seconds and there is still no reply from the called telephone Ct, the fictitious ringing signals are re-transmitted until someone answers the called telephone Ct.

A number of different alternatives can now occur, these alternatives being described one by one hereinafter.

Telefax Reception

See FIGS. 2a, 2b, 2c, 7, 8, 9a, 9b, 9c. If the message centre MC detects an incoming telefax message within 3–4 seconds, blocks 114, 118, the service switching point SSP will order the called telephone Ct to stop ringing and releases the channel/channels 5, 6 from the message centre MC to the called telephone Ct, block 124. During this time, the telefax message is received in the message centre MC and stored therein, block 142. Billing of the calling subscriber commences at the beginning of the transmission of the telefax message from the calling terminal A.

According to one embodiment (see FIGS. 1a and 9a), the whole of the telefax message is received initially in the message centre MC, block 142. A channel 11 is then setup between the message centre MC and the called telefax machine Cf, and the telefax message is then transmitted, block 144.

According to another embodiment (see FIGS. 2a and 9b), a channel 11 is setup immediately between the message centre MC and the called telefax machine Cf, blocks 142, 146. When the message centre MC has received a part of the telefax message, this message part is sent to the called telefax machine Cf while the message centre MC continues to receive a further part of the telefax message. Although time is saved in this way, a more intelligent message centre MC will, of course, be required. It is also conceivable not to use any form of intermediate storage and/or to setup a channel between the calling terminal A and the called telefax machine Ct externally of the message centre MC.

Figure 2A:
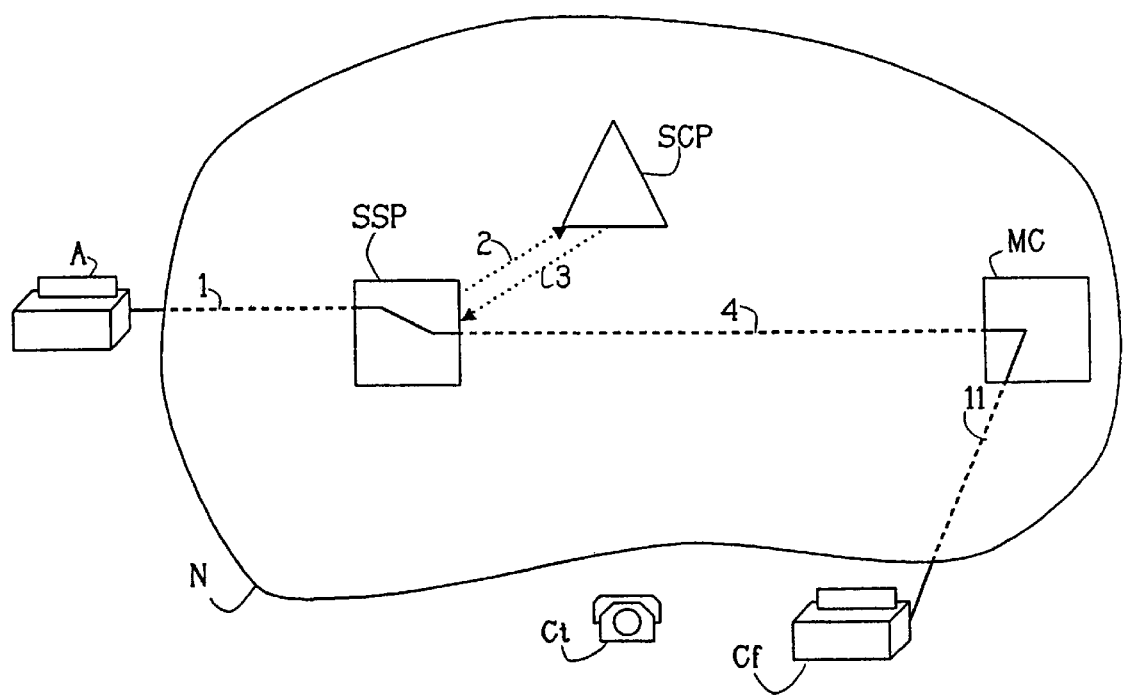
FIGS. 2a, 2b and 2c are diagrammatic illustrations of different embodiments for receiving telefax signals or data signals.
Figure 2B:
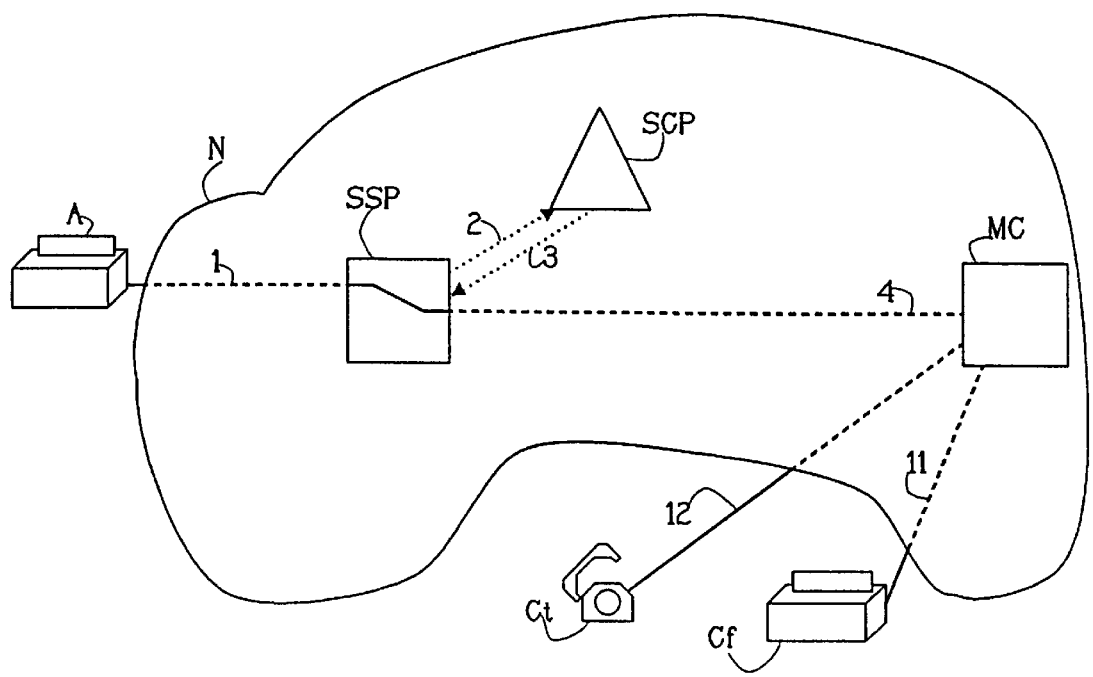
Figure 2C:
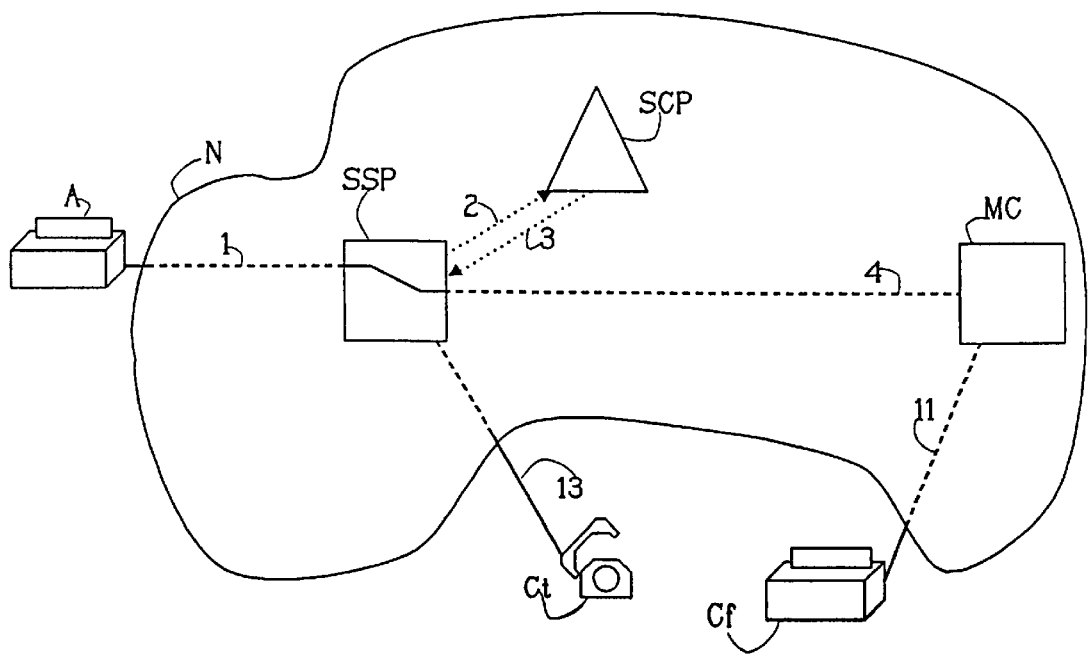
Figure 9A:
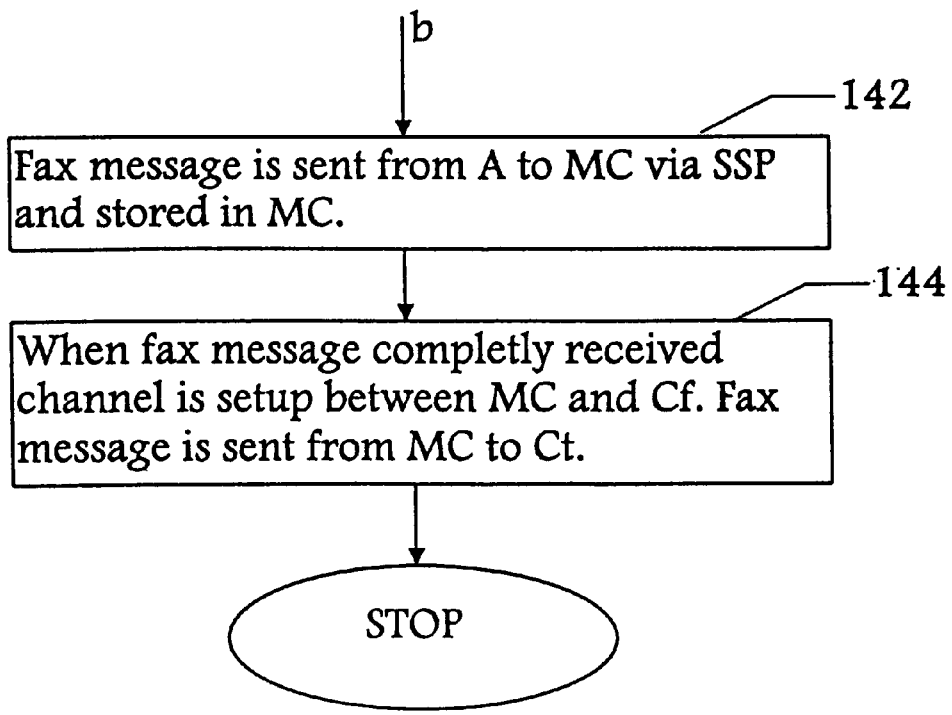
FIGS. 9a, 9b and 9c are continuations of FIG. 8 and illustrate different variants of receiving telefax signals or data signals.
Figure 9B:
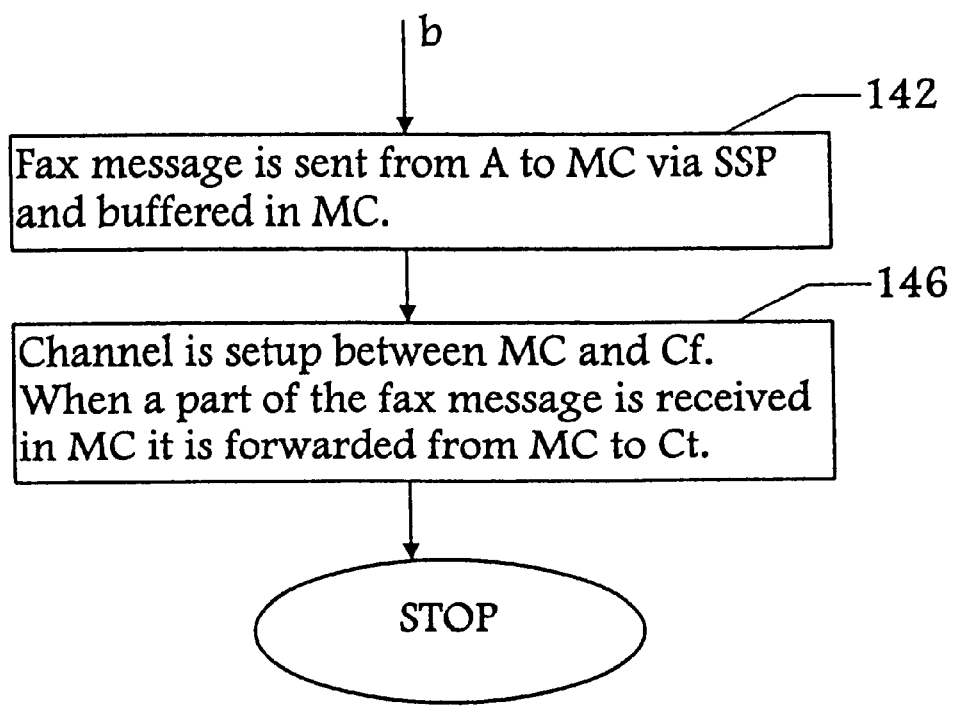
Figure 9C:
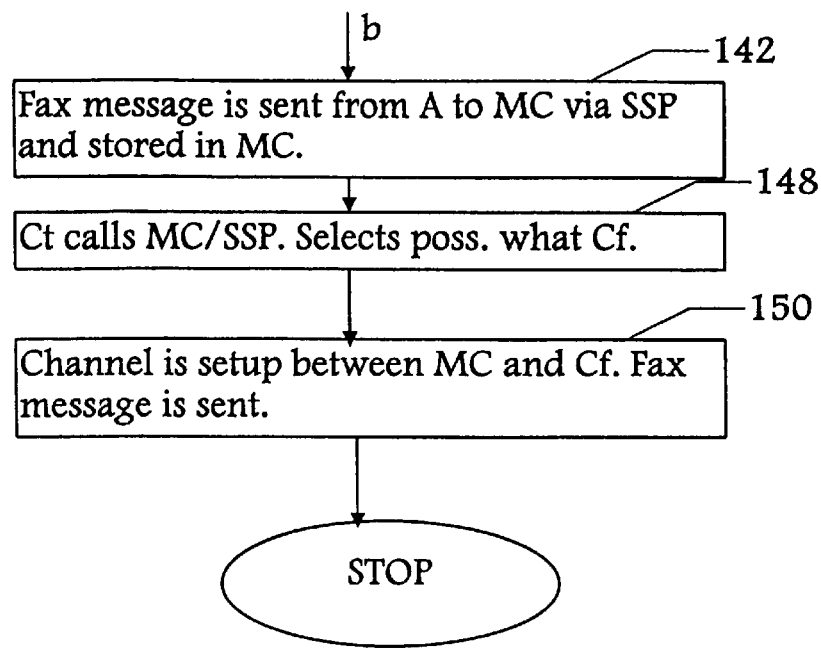

According to other embodiments shown in FIGS. 2b, 2c and 9c, the telefax message remains in the message centre MC until someone calls from a telephone Ct, block 148, either to the service switching point SSP over a channel 13, or directly to the message centre MC over a channel 12 and requests printing-out of the telefax message. The telefax machine Cf on which the telefax message shall be printed-out may also be chosen as an optional feature. A channel 11 is then setup between the message centre MC and the called telefax machine Cf, whereafter the telefax message is sent, block 150.

Messages concerning the receipt of a telefax message may be transmitted as SMS messages (Short Message Service) or the like to a mobile telephone Ct, thereby enabling the message characters to be sent to the mobile telephone Ct and there displayed. Alternatively, the subscriber must call at regular intervals on telephone Ct and check whether or not a telefax message is waiting. Finally, it is conceivable not to release the channel/channels 5, 6 between the message centre MC and the called telephone Ct when identifying a telefax machine as the caller, but to allow the called telephone Ct to ring until someone answers. When the call is answered, a message to the effect that "You have received a telefax message. Where do you wish it to be sent?" is delivered.

Telefax Message Reception When the Telephone is Answered Quickly

Figure 3:
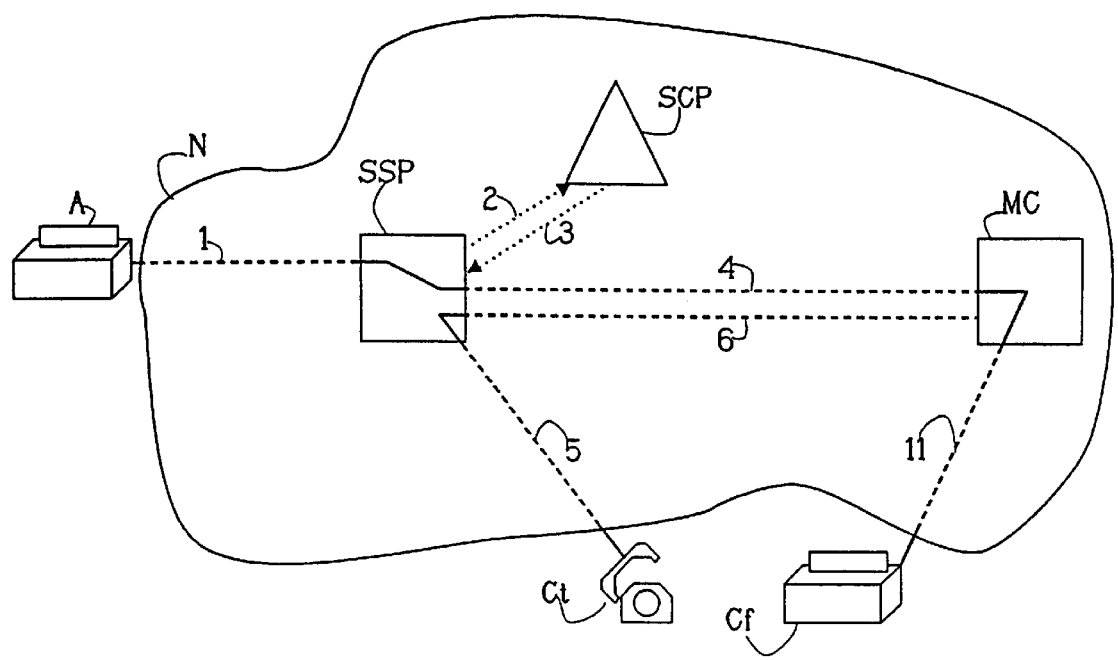
FIG. 3 is a diagrammatic illustration of the case when a telefax signal or data signal is received by a person who answers the telephone quickly.

See FIGS. 3, 7 and 8. If, in the above example, the called telephone Ct is answered before telefax detection is completed, block 114, the message centre MC delivers to the called telephone Ct a recorded message on the channel/channels 5, 6. The message may read, for instance, "Facsimile detection is in progress. Please wait.", block 116.

If it is then found that the call actually was a telefax message, blocks 114, 118, 120, the message centre MC delivers a further message, e.g. "You will receive a telefax message. Please replace the receiver", block 122.

When the telefax message is stored solely in the message centre MC, the alternative message "You have received a telefax message. Where do you want it sent?" may be delivered.

Call Reception

Figure 4:
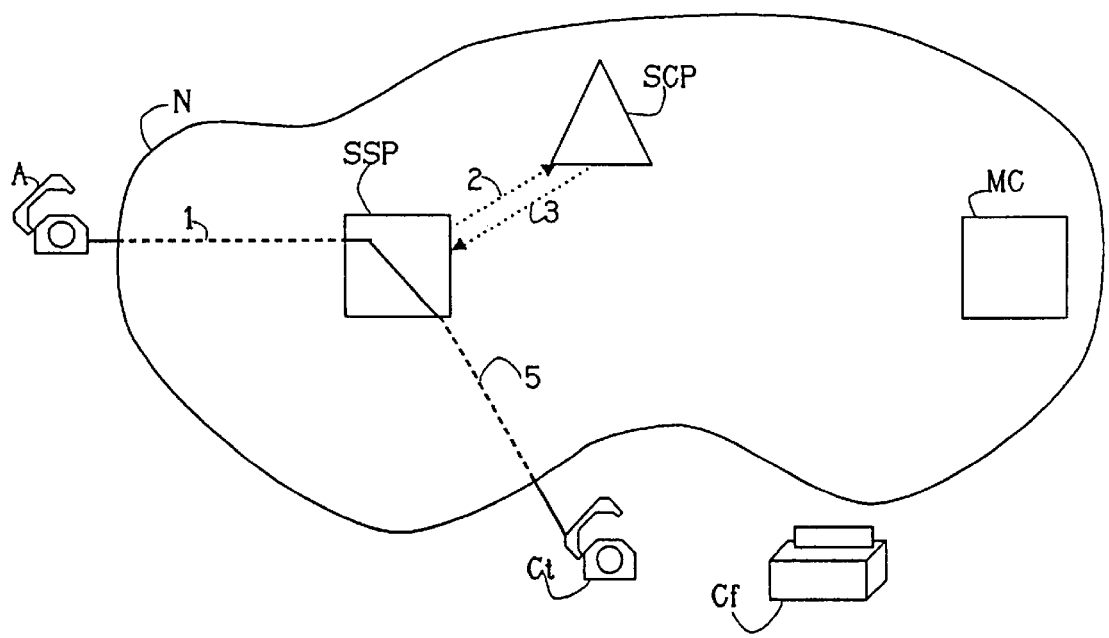
FIG. 4 is a diagrammatic illustration of a call.

If the message centre MC does not detect any incoming telefax messages, the channels 4, 6 between the service switching point SSP and the message centre MC are released; see FIGS. 4 and 8, block 118. Instead, the service switching point SSP connects the channel 5 between the terminal A and the service switching point SSP with the channel 1 between the service switching point and the called telephone Ct, block 130. When the receiver of the called telephone Ct is then lifted, block 132, FIGS. 10abc, the call can be dealt with in a conventional manner, block 136.

Call Reception When the Telephone is Answered Quickly

Figure 5:
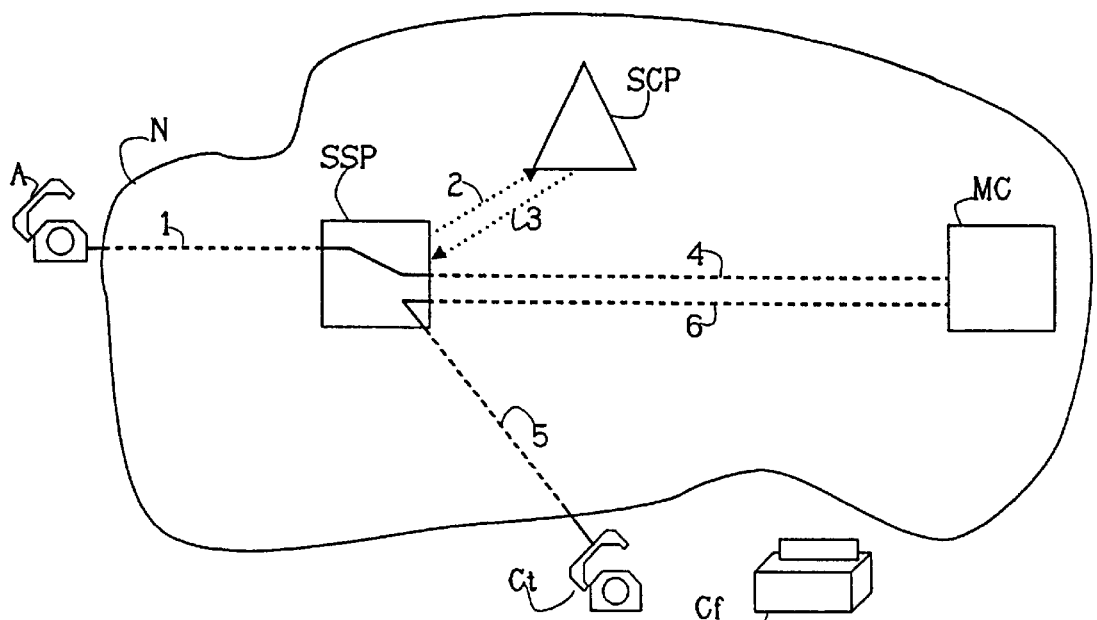
FIG. 5 is a diagrammatic illustration of a call reception when the telephone is answered quickly.

Should the called telephone Ct of the above example be answered before telefax detection is completed, block 114, the message centre MC will deliver a recorded message to the called telephone Ct, along the channel/channels 5, 6; see FIGS. 5 and 7. The message may be to the effect that "Telefax detection is in progress. Please wait.", block 116.

If it is later found that the call did not relate to a telefax message, blocks 114, 118, 126, the message centre MC sends another message, e.g. "Call established", block 134, so that the person who answered the telephone will be aware that the telefax detection process has been completed and that it was a person who called and not a telefax machine, block 136.

Call Reception Without the Telephone Ct Being Answered

Figure 6:
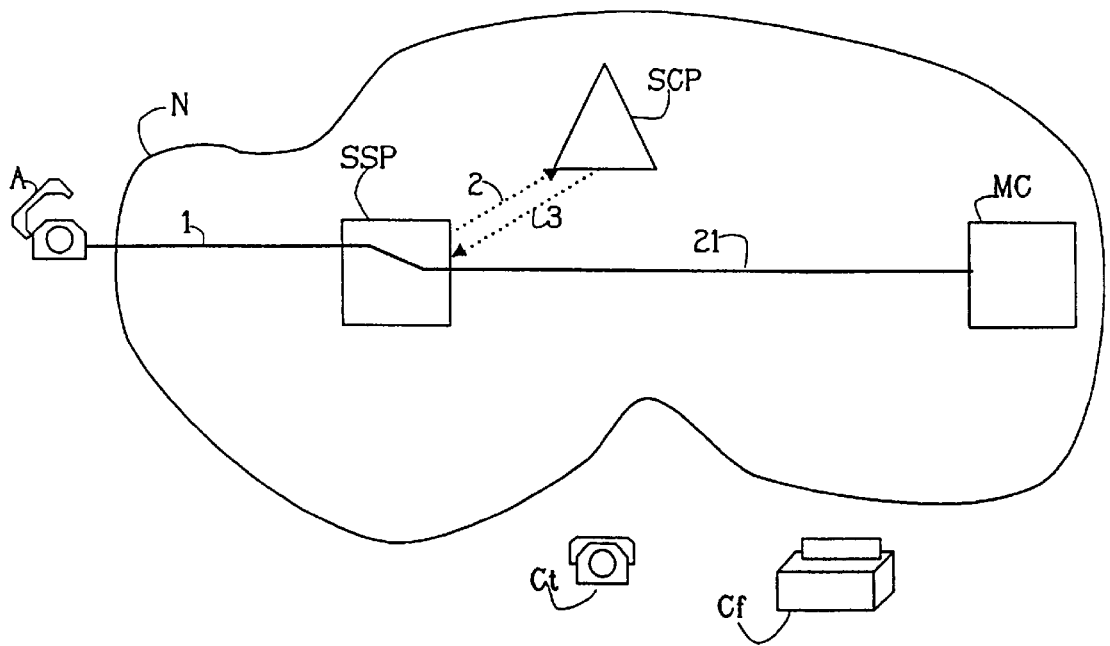
FIG. 6 is a diagrammatic illustration of a call reception when the telephone is not answered.

See FIGS. 4, 8 and 6. If the message centre MC does not detect an incoming telefax message, block 118, the channels 4, 6 between the service switching point and the message centre MC are released, block 130. The service switching point SSP instead connects the channel 1 between the calling terminal A and the service switching point SSP to the channel 5 between the service switching point SSP and the called telephone Ct.

If the receiver of the called telephone Ct has still not been lifted after a given time lapse, a new channel 21 is setup between the message centre MC (or some other message centre MC) and the service switching point SSP. This channel 21 is coupled to the channel 1 between the service switching point SSP and the calling terminal A. The message centre MC then sends to the calling terminal A on the channel/channels 1, 21 a message, that may read, for instance, "Still searching for the subscriber. Please wait.", FIG. 10b, block 162.

Figure 10A:
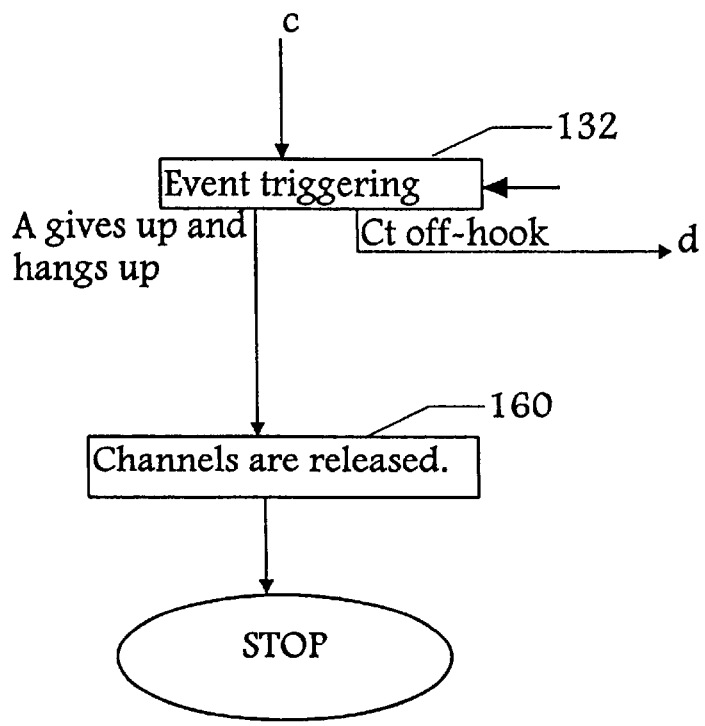
FIGS. 10a, 10b and 10c are continuations of FIG. 8 and illustrate different variants of call reception when the telephone is not answered.
Figure 10B:
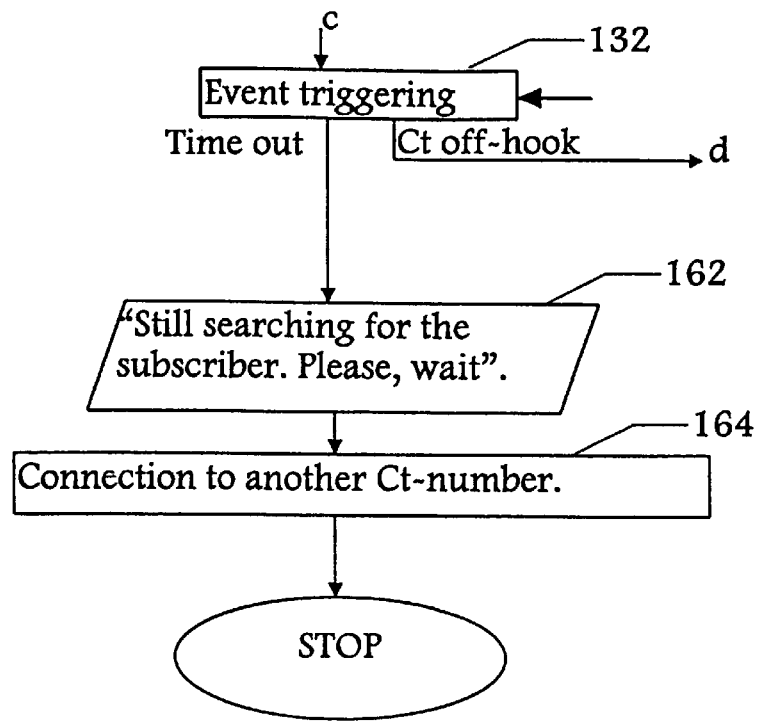
Figure 10C:
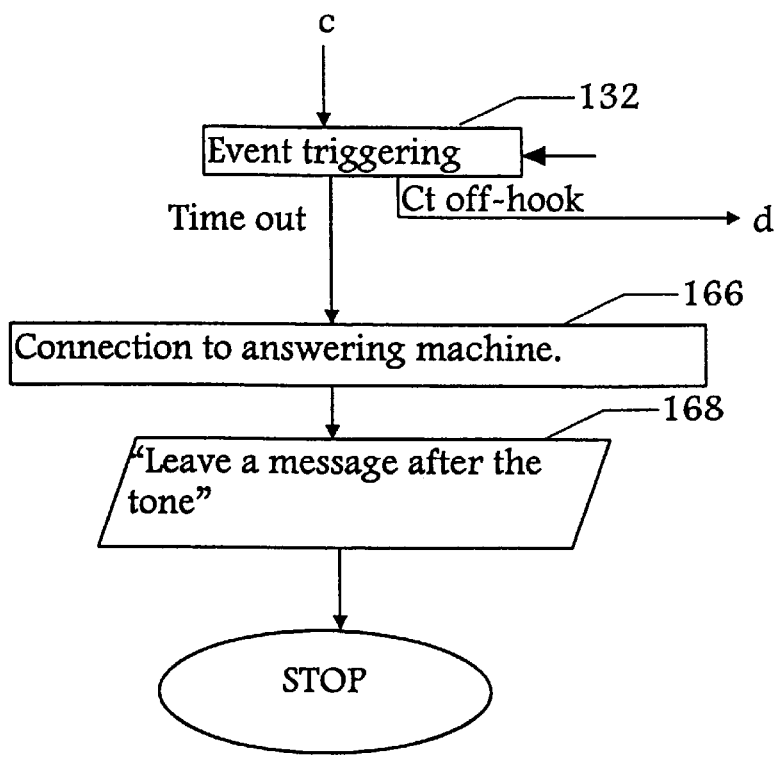

One or more connections to other telephones Ct can then be tested, block 164, or a connection to a telephone answering machine may be made, FIG. 10c, blocks 166, 168.

As illustrated in FIG. 10a, an alternative is simply to allow the called telephone Ct to ring until someone answers or until the subscriber of the calling terminal A gives up and replaces the telephone receiver, blocks 132 and 160.

OTHER EMBODIMENTS

Only telefax machines and messages have been dealt with in the aforedescribed embodiments. It will be understood that other forms of data transmissions over a telephone network can be carried out in an equivalent manner, e.g. between computers provided that the computers understand one another. It is also, of course, conceivable to listen for several types of data simultaneously and to forward the data to the correct location, depending on type.

Accordingly, the service switching points SSP, the service control points SCP and the message centres MC have been drawn inside the telephone network N, although it will be understood that the same function can be achieved in a similar manner outside the telephone network N. The service control point SCP may also be integrated with the service switching point SSP in one and the same point or node.

The messages delivered by the message centre may also be presented in a way other than by voice, for instance presented on a telephone display.

When reference is made in the description to the action of "lifting a receiver", it will be understood that mobile telephones, loudspeaker telephones and the like with which a receiver is not lifted in order to answer a call are also included.

We claim:

1. A method for setting up a connection between a first terminal, which may be a calling telephone, a calling telefax machine, a computer or some other equipment capable of making a call, and a second terminal which may be a called telephone on the one hand or, on the other hand, a called telefax machine, computer or some other equipment capable of receiving a call, wherein the first terminal first calls a subscriber number, characterized in that in addition to calling the subscriber number, the method comprises the steps of:

sending a fictitious reply to the first terminal and initiating monitoring of the first terminal in order to identify the type of terminal concerned with the aid of any signals and/or any message that are/is sent;

ordering a called telephone at a first network address to commence ringing at the same time as the fictitious reply is sent; and ordering the called telephone to cease ringing upon detection of signals or a message from a telefax machine, computer or the like, receiving a possible message and sending the message to a second terminal on a second network address, said second terminal being adapted to receive the message from the first terminal; otherwise connecting the called telephone to the first terminal;

wherein when the first terminal is a telefax machine, the fictitious reply causes the telefax machine to send a telefax message.

2. A method according to claim 1, characterized by setting up a first channel between the first terminal and a service switching point when the first terminal calls the subscriber number;

thereafter investigating the subscriber number and setting up a second channel between the service switching point and a message center when the subscriber number is identified as being a certain type of telephone number, and then connecting the first channel to the second channel and sending the fictitious response to the first terminal, whereafter the message centre listens for any signals or a possible message on the mutually connected first and second channels;

setting up a third channel between the message centre and the service switching point, and setting up a fourth channel between the service switching point and a called telephone in the space of time taken to setup said second channel, and thereafter connecting the third channel to the fourth channel and ordering the called telephone to begin ringing; wherein when signals and/or a message are/is detected within a given period of time, the message is received and stored in the message centre, the called telephone is ordered to cease ringing and the third channel and the fourth channel are released; otherwise the second channel and the third channel are released and the first channel is connected to the fourth channel so as to enable a call connection to be established between a person at the first terminal and a person at the called telephone.

3. A method according to claim 2, characterized by setting up a fifth channel from the message centre to the second terminal that is capable of receiving the message from the first terminal subsequent to having received the full message in the message centre, whereafter the message centre sends the message to said second terminal over said fifth channel.

4. A method according to claim 2, characterized by setting up a fifth channel from the message centre to the second terminal that is capable of receiving said message from the first terminal upon receipt of part of the message in the message centre, and thereafter sending said message part to said second terminal over said fifth channel, essentially at the same time as a further part of the message is received in the message centre.

5. A method according to claim 2, characterized by setting up a fifth channel from the message centre to the second terminal that is capable of receiving the message from the first terminal when a person calls from a telephone to the service switching point or to the message centre and delivers a telefax printout command, a data transmission command, or some like command, and thereafter sending the message to said second terminal over said fifth channel.

6. A method according to claim 2, characterized by sending a message to the called telephone from the message centre when the call on the telephone is answered before detection is complete.

7. A method according to claim 2, characterized by sending a message to the first terminal from the message centre when said detection is negative and subsequent to the passage of a predetermined time period when the call on the called telephone has still not been answered.

8. The method of claim 1, wherein when the first terminal is a telefax machine, the telefax machine sends handshake signals after receiving the fictitious reply.

9. A system for setting up a connection between a first terminal, which may be a calling telephone, telefax machine, computer or some other equipment capable of making a call, and a second terminal which may be a called telephone on the one hand, or, on the other hand, a telefax machine, computer or some other equipment capable of receiving a call, characterized in that the system includes means for sending a fictitious response to the first terminal and for causing a called telephone on a first network address to commence ringing at the same time as the fictitious reply is sent and to cease ringing upon detection of signals or a message from a telefax machine, computer or the like, means for detecting and receiving possible signals or messages and thereby identifying a type of the first terminal, and for sending a received message to a second terminal on a second network address, said second terminal being capable of receiving messages from the first terminal, and means for connecting the called telephone to the first terminal when no signals or messages are detected, wherein when the first terminal is a telefax machine, the fictitious reply causes the telefax machine to send a telefax message.

10. A system according to claim 9, characterized by means for investigating and identifying the subscriber number.

11. A system according to claim 9, characterized by means for sending a message to the first terminal and/or the second terminal concerning events that are taking place during the establishment of the connection.

12. The system of claim 9, wherein when the first terminal is a telefax machine, the telefax machine sends handshake signals after receiving the fictitious reply.

* * * * *